United States Patent Office 3,085,999
Patented Apr. 16, 1963

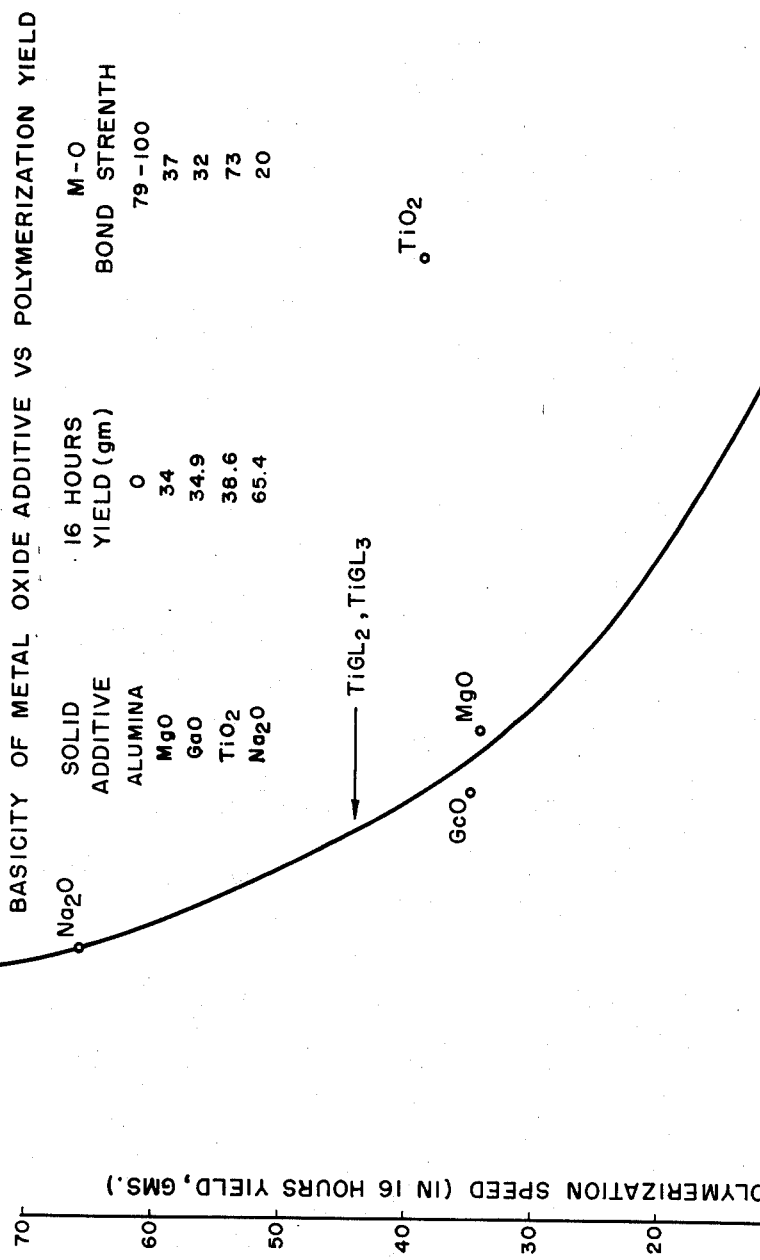

3,085,999
METAL OXIDE PROMOTER FOR ALKALI METAL ALKYL-TRANSITION METAL HALIDE CATALYST
Shao E. Tung, Ponca City, Okla., assignor to Continental Oil Company, Ponca City, Okla., a corporation of Delaware
Filed Dec. 28, 1959, Ser. No. 862,326
2 Claims. (Cl. 260—93.5)

This application relates to catalyst and process for the polymerization of ethylenically unsaturated monomers. In one aspect, it relates to a catalyst comprising an organometal compound, a transition metal halide, and a compound selected from the group consisting of metal oxides and metal bases and process for polymerizing mono-olefins with said catalyst.

It is known in the field of polymerization that certain materials can be utilized in polymerization catalyst systems to promote the polymerization reaction both with respect to activity and selectivity. For example, it is well known that organic peroxides such as benzoyl peroxide, dicumyl peroxide, etc., exert a promoting and cross-linking effect in various polymerization catalysts systems. It is also known to employ highly oxidized inorganic compounds such as inorganic peroxides, persulfates, perborates and the like in the polymerization of olefins such as ethylene, utilizing conventional organometal catalyst systems. The promoters which have been employed have been characterized by their high oxygen content including particularly those compounds which are capable of releasing free oxygen and thereby varying the properties of the polymer products.

It is an object of this invention to provide new and improved catalyst and process for the polymerization of ethylenically unsaturated monomers.

Another object of this invention is to provide new and improved catalyst and process for the polymerization of olefin hydrocarbons.

Still another object of this invention is to provide new and improved catalyst and process for increasing polymer yield.

Still another object of this invention is to provide improved catalyst and process for the polymerization of ethylene.

Another object of this invention is to provide new and improved catalyst and process for the preparation of isotactic polystyrene.

These and other objects of the invention will become more readily apparent from the following detailed description and discussion.

The foregoing objects are realized broadly by providing a catalyst composition comprising an organometal compound, a transition metal halide, and a compound selected from the group consisting of metal oxides and metal bases. The metal oxides and bases are characterized in that all of the oxygen which is bonded to the metal is bonded by primary valence bonds.

In one aspect of the invention, the catalyst composition comprises an alkali metal organo compound, a transition metal halide and a metal oxide in which the metal-to-oxygen bond strength, determined as hereinafter set forth, is not greater than about 20.

In another aspect of the invention, the foregoing catalysts are employed in the polymerization of ethylenically unsaturated monomers.

The catalyst of the present invention includes broadly the conventional organometal-transition metal halide polymerization catalysts. It is well known in the art that the various transition metal halides, for example, chlorides, bromides, etc., of the metals of groups III, IV, V, VI, VII, and VIII of the periodic table are active in the polymerization of ethylenically unsaturated monomers. The halides of the metals of groups IV-A, V-A, and VI-A are especially active in polymerization, particularly the halides of titanium, zirconium, vanadium, chromium, and molybdenum. Of the latter halides, the more frequently used material and the halide preferred in this invention is titanium tetrachloride.

An important element of the catalyst system is the organometal compound, which can include in general alkyl, cycloalkyl, aryl and alkaryl and aralkyl derivatives of various metals particularly alkali metals of group I-A of the periodic table and metals of groups II-A, II-B, III-A, IV-B, and V-B, including titanium, aluminum, beryllium, zinc, indium, gallium, magnesium, boron, and the like. A preferred group of catalysts include as the organometal component alkali metal alkyl compounds and alkali metal alkaryl compounds. Specific example of these compounds include materials such as amyl sodium, parasodio tertiary butyl benzene, octyl sodium, phenyl sodium, butyl sodium, etc.

The metal oxides which are employed in the novel catalysts of this invention include generally the metal oxides, and more particularly the basic metal oxides, i.e., those oxides which, when reacted with water, form a base. In one aspect of the invention the metal oxides are defined by metal-to-oxygen bond strength as determined by the method of Kuan-Han Sun and reported in the Glass Industry, February 1948, pages 73, 74, and 98. In the article by Mr. Sun metal-to-oxygen bond strength is estimated from the disassociation energy of the metal oxide in glass and the oxygen co-ordination of the metal. The values obtained are listed in Table I below which is reproduced from the Sun article.

TABLE I

Scale of Acidity and Basicity in Glass

GLASSFORMERS

| | $M_mO_n$ | Coordination No. of M Adopted | The Arbitrary Scale (M–O Bond Strength) |
|---|---|---|---|
| Acid Base | $B_2O_3$ | 3 | 119 |
| | $B_2O_3$* | 3, 4 | 113 |
| | $SiO_2$ | 4 | 106 |
| | $GeO_2$ | 4 | 108 |
| | $P_2O_5$ | 4 | 88–111 |
| | $V_2O_5$ | 4 | 90–112 |
| | $Al_2O_3$ | 4 | 79–101 |
| | $B_2O_3$ | 4 | 89 |
| | $As_2O_5$ | 4 | 70–87 |
| | $Sb_2O_5$ | 4 | 68–85 |
| | $ZrO_2$ | 6 | 81 |

INTERMEDIATES

| | | | |
|---|---|---|---|
| Acid Base | $TiO_2$ | 6 | 73 |
| | $Al_2O_3$ | 6 | 53–67 |
| | $ThO_2$ | 8 | 64 |
| | $BeO$ | 4 | 63 |
| | $ZrO_2$ | 8 | 61 |

TABLE I—Continued

MODIFIERS

| | | | |
|---|---|---|---|
| Acid Base | Sc₂O₃ | 6 | 60 |
| | La₂O₃ | 7 | 58 |
| | Y₂O₃ | 8 | 50 |
| | SnO₂ | 6 | 46 |
| | Ga₂O₃ | 6 | 45 |
| | In₂O₃ | 6 | 43 |
| | ThO₂ | 12 | 43 |
| | PbO | 6 | 39 |
| | MgO | 6 | 37 |
| | Li₂O | 4 | 36 |
| | PbO | 4 | 36 |
| | ZnO | 4 | 36 |
| | CaO | 8 | 32 |
| | SrO | 8 | 32 |
| | BaO | 8 | 33 |
| | CdO | 4 | 30 |
| | Na₂O | 6 | 20 |
| | CdO | 6 | 20 |
| | K₂O | 9 | 13 |
| | Rb₂O | 10 | 12 |
| | HgO | 6 | 11 |
| | Cs₂O | 12 | 10 |

\* In ordinary commercial borosilicate in which there are abundant of oxygen for all boron to change to coordination of 4. Unpublished investigation by the author, however, reveals that only about 20 percent of the total boron atoms take 4-fold coordination, the rest remain in a coordination number of 3.

Depending on the particular catalyst system, certain metal oxides are preferred. For example, when the organometal component is an alkali metal organo-compound, optimum results are obtained with metal oxides having a metal-to-oxygen bond strength (see Table I) not greater than about 20. With catalyst systems including other organometal components, metal-to-oxygen bond strength of the oxide is not critical, and any of the metal oxides can be used. The metal oxides which can be employed, however, are limited to those in which the oxygen is bonded to the metal by primary valence bonds. These metal oxides are readily distinguished from highly oxidized materials such as peroxides, perborates, and the like in which there is either bonding between oxygen atoms or bonding between oxygen and secondary metal valence bonds or both. These highly oxidized materials readily release oxygen which can substantially affect the properties of the polymerization product. There is no release of oxygen from the metal oxides employed in the catalysts of this invention. Preferably the metal oxides are employed substantially free of other materials. However, it is within the scope of the invention that minor amounts of more highly oxidized metals be present, but the catalyzing or promoting action is due essentially to the metal oxide in which the oxygen is bonded to the metal by primary valence bonds.

The metal hydroxides which are used in the catalyst composition include, broadly, hydroxides of the metals set forth in Table I. Specific hydroxides which can be employed include compounds such as sodium hydroxide, potassium hydroxide, calcium hydroxide, magnesium hydroxide, and the like.

A wide variety of specific catalyst systems can be employed and are readily determined by those skilled in the art. Specific examples of typical catalyst systems include compositions such as amyl sodium, titanium tetrachloride, and sodium oxide; triethylaluminum, zirconium tetrachloride, and calcium oxide; tetraethyl lead, titanium tetrachloride, and rubidium oxide; octyl sodium, titanium tetrachloride, and cesium oxide; triethyl aluminum, titanium tetrachloride, and sodium oxide, para-sodio, tetrabutyl benzene, zirconium tetrachloride, and cesium oxide; diethyl zinc, titanium tetrachloride, and calcium oxide, triethylaluminum, titanium tetrachloride, and titanium monoxide; amyl sodium, zirconium tetrachloride, and rubidium oxide; triethylaluminum, titanium tetrachloride, and sodium hydroxide; triethylaluminum, titanium tetrachloride, and potassium hydroxide, triethylaluminum, titanium tetrachloride, and lithium hydroxide; diethyl zinc, titanium tetrachloride, and calcium hydroxide; tetraethyl lead, zirconium tetrachloride, and potassium hydroxide; and the like.

Generally, the organometal compound is present in the catalyst system in excess, usually in a mole ratio of from about 1:1 up to as high as 10:1 in relation to the transition metal halide. The amount of metal oxide or hydroxide employed will vary, depending on the particular catalyst system, usually from between about $1 \times 10^{-8}$ and about one mole per mole of transition metal halide compound and preferably between about $1 \times 10^{-8}$ and about $1 \times 10^{-4}$ moles per mole. Larger amounts of the metal promoter can be used; however they are not necessary or desirable to obtain effective promotion of the polymerization reaction.

The catalyst is prepared in any suitable manner by combining the various components in the desired order in the presence of an inert gas such as nitrogen whereby air is excluded from the system. The particular order of addition or combination of the catalyst components is not critical; however usually the organometal component or metal halide is added to the metal oxide or hydroxide, after which the other component is added, to complete the catalyst composition.

The catalyst of this invention can be employed generally in the conversion of polymerizable ethylenically unsaturated monomers. These monomers include materials which are well known in the art to be polymerizable in the presence of conventional organometal containing catalysts, including aromatic and aliphatic mono 1-olefins, diene monomers, etc., and admixtures of various polymerizable monomers. Preferably the catalysts are employed in the polymerization of polymerizable 1-olefins, particularly aliphatic 1-olefins containing up to 8 carbon atoms, including materials such as ethylene, propylene, butene, and the like and aromatic 1-olefins, such as styrene, methyl styrene, and the like. The reaction conditions, that is, temperature, pressure time, etc., employed in the polymerization reaction, vary widely depending on the particular monomers used and on the composition of the catalyst. In general, reaction conditions which are well known in the art can be employed and can be varied as required for the particular polymerization system. Usually substantially atmospheric temperatures are employed; however it is within the scope of the invention to use temperatures ranging from subatmospheric up to as high as 200° C. The reaction pressure is usually somewhat above atmospheric and can vary widely within the limitations of the processing equipment. The reaction time can be varied depending usually on the degree of conversion desired.

The polymerization reaction can be carried out in any suitable manner, that is, in the liquid or gas phase. Generally it is preferred to carry out the reaction in the presence of a liquid diluent which serves as a carrier for the catalyst, as a heat sink for a polymerization temperature control and as a diluent and sometimes partial solvent for the polymer product. The diluent which is usually a hydrocarbon can be any material ordinarily employed in organometal containing catalyst systems, specifically a paraffin, such as butane, pentane, hexane, heptane, etc., or a cycloparaffin such as cyclohexane, cyclopentane, methylcyclopentane, and the like. Usually the diluent is selected from compounds containing from about 6 to about 12 carbon atoms.

The polymers which are prepared utilizing the catalyst of the invention can vary through the range of liquid and tacky materials to highly dense solid polymers and find application in the various fields where polymers of ethylenically unsaturated monomers, such as ethylene, are normally used.

The catalyst compositions of this invention provide a particular advantage in view of the unexpected beneficial results obtained when using only trace quantities of the metal oxide or hydroxide. For example, it is possible to obtain the desired promotion by employing solutions of substantially insoluble oxides or hydroxides in the catalyst system wherein the amount of oxide or hydroxide is present in only minute quantities, for example, from about 1 part per billion to about 1 part per million by weight with respect to the transition metal halide component. The use of minute quantities of promoter in solution provides a number of advantages as compared to the solid promoter. For example, the promoter when present in only very small quantities can be used without attempting recovery thereof; also it can be used in amounts which do not have a detrimental effect on the resulting polymer products.

The following examples are presented in illustration of the invention:

EXAMPLE 1

Solid metal oxide, either in powder or in granular form, was dried for 16 hours at 180° C. in an atmosphere of helium. The dried solid was transferred to a glass jar under helium atmosphere which purged with nitrogen gas and sealed with a neoprene rubber seal and a metal cap. To the sealed jar was injected the following through a hypodermic:

Hexane—volume equal to the solid
Titanium tetrachloride (in hexane solution)—0.075 mole
Amyl sodium (in heavy alkylate solution)—0.075 mole
Hexane (dried)—500 millimeters The jar was then inverted, and ethylene was admixed through a hypodermic for polymerization. The reaction was maintained at a pressure of 40 p.s.i. and carried out for a period of 16 hours. Following this, the jar was opened and the catalyst neutralized by the addition of 500 milliliters of methyl alcohol. The polymer was removed by filtering, the filter cake was processed in a Waring Blendor for two minutes and then washed sucressfully with washing solutions as follows:

500 milliliters methylalcohol plus 15 milliliters hydrochloric acid
250 milliliters methylalcohol pus 250 milliliters water
1000 milliliters of water The washed polymer cake was dried over night in a vacuum oven (20 millimeters mercury pressure) at 60° F. and weighed with the results set forth in Table II.

A run was also carried out utilizing a similar procedure with sodium hydroxide as the promoter.

TABLE II

| Metal Oxide | Metal Oxide, Volume (ml.) | Polymer Yield (gm.) |
|---|---|---|
| None | | 44.0 |
| NaOH | 15 | 44.0 |
| $Al_2O_3$ | 100 | trace |
| MgO | 100 | 34.0 |
| CaO | 15 | 34.9 |
| $TiO_2$ | 15 | 38.6 |
| $Na_2O$ | 15 | 65.4 |

It is noted that sodium oxide which is highly basic (high metal-to-oxygen bond strength) increases the polymerization yield from 44 grams to 65.4 grams. The polymerization yield can be correlated with the basicity of the solid metal oxide as shown in FIGURE 1. Referring to FIGURE 1, titanium dioxide appears to be more basic than predicted from the bond strength, probably because of the reduction of titanium dioxide to oxides of lower valence state, which would be more basic. Sodium hydroxide provided no promoting effect.

EXAMPLE 2

Solid metal oxides were heated in stainless steel bottles (one gram in each bottle) at 300° C. for about 16 hours in an atmosphere of helium. To the dried heated solids in each bottle was added 500 milliliters of dried hexane, 1 m. mole of titanium tetrachloride, and 1.5 m. mole of aluminum triethyl. The bottles, each containing a different metal oxide, were weighed and mounted upright on a shaker. Delivery of scrubbed ethylene gas to the polymerization bottles was through stainless steel needles, with reaction being carried out at 40 p.s.i.g. pressure and at room temperature. Shaking was initiated after the ethylene was admitted. The shaker vibrated through a 2-inch stroke at 250 vibrations per minute. The polymerization bottles were weighed at intermittent intervals. The total weight gained after 12 hours, corrected for ethylene pressure and ethylene dissolved in pressure, was taken as the ultimate yield. The results of the yields are tabulated in Table 3.

TABLE III

| Metal oxide: | Polyethylene yield |
|---|---|
| None | 8.5 |
| MgO | 36.1 |
| $Na_2O$ | 44.0 |
| $Al_2O_3$ | 38.0 |
| $Cs_2O$ | 42.2 |
| $SiO_2$ | 31.7 |
| $Rb_2O$ | 37.6 |
| TiO | 29.6 |
| $T_{12}O_3$ | 38.1 |
| $TiO_2$ | 39.8 |
| CaO | 30.1 |

It is noted that, when the aluminum triethyl-titanium tetrachloride catalyst system is employed, the metal oxides in general promote the polymerization reaction.

EXAMPLE 3

Polymerization runs were carried out employing sodium oxide, titanium oxide, and sodium hydroxide as promoters, utilizing a similar procedure to that employed in Example 2 except that a saturated solution of oxide or hydroxide in hexane was used rather than solid promoter. The saturated solution of promoter was prepared by adding hexane to the dried solid, removing supernatant solution of the promoter in the hexane and adding the supernatant solution to additional hexane to bring the total of solvent used to 500 milliliters. The results of these polymerization runs are presented in Table 4.

In addition to the runs employing the promoter in solution, runs were carried out utilizing the solid promoters.

TABLE IV

| Type | Promoter, Amount [1] | Catalyst Components, Moles | | Polymer Yield, gm. |
|---|---|---|---|---|
| | | $TiCl_4$ | Aluminum Triethyl | |
| $Na_2O$ | 0 | 1.0 | 1.5 | 26.2 |
| $Na_2O$ | 20 | 1.0 | 1.5 | 75.4 |
| $Na_2O$ | 40 | 1.0 | 1.5 | 86.6 |
| $Na_2O$ | 60 | 1.0 | 1.5 | 86.1 |
| $Na_2O$ | Solid | 1.0 | 1.5 | 88.1 |
| $Na_2O$ | 0 | 0.75 | 1.03 | 9.4 |
| $Na_2O$ | 20 | 0.75 | 1.03 | 23.9 |
| $Na_2O$ | 40 | 0.75 | 1.03 | 51.8 |
| $Na_2O$ | 60 | 0.75 | 1.03 | 56.9 |
| $Na_2O$ | 100 | 0.75 | 1.03 | 57.0 |
| $Na_2O$ | Solid | 0.75 | 1.03 | 58.6 |
| TiO | 0 | 1.0 | 1.5 | 9.0 |
| TiO | 20 | 1.0 | 1.5 | 56.5 |
| TiO | 40 | 1.0 | 1.5 | 51.6 |
| TiO | 60 | 1.0 | 1.5 | 69.3 |
| TiO | 100 | 1.0 | 1.5 | 55.0 |
| NaOH | 0 | 1.0 | 1.5 | 17.8 |
| NaOH | 20 | 1.0 | 1.5 | 73.7 |
| NaOH | 40 | 1.0 | 1.5 | 90.5 |
| NaOH | 60 | 1.0 | 1.5 | 87.2 |
| NaOH | 100 | 1.0 | 1.5 | 92.5 |
| NaOH | Solid | 1.0 | 1.5 | 83.3 |

[1] Milliliters of solution saturated with promoter in total of 500 cc. of hexane solvent employed in the polymerization reaction.

It is noted from the data that both the hydroxide and oxides provide a substantial promoting effect in the polymerization reaction. The data also indicate that the ultimate yield of polymer, which is present in amounts down to trace quantities, that is, down to about as low as $1 \times 1.0^{-8}$ parts per part of organo metal catalyst component, increases with the amount of promoter until it reaches a maximum. This maximum value varies with changes in catalyst concentration.

EXAMPLE 4

Polymerization runs were also carried out employing potassium hydroxide, calcium hydroxide, and magnesium hydroxide as promoters in the same catalyst system as Example 3. Similar procedure to that employed in Example 3 was used. Results of the polymer yield after 12 hours of polymerization are presented in Table V.

TABLE V

| Metal Hydroxide | Amount [1], ml | Polyethylene Yield After 12 Hours, Gm. |
|---|---|---|
| None | | 8.5 |
| NaOH | 500 | 38.0 |
| KOH | 500 | 30.1 |
| Ca(OH)$_2$ | 500 | 31.2 |
| Mg(OH)$_2$ | 500 | 44.8 |

[1] Saturated solution in hexane solvent.

Having thus described the invention by providing specific examples thereof, it is to be understood that no undue limitations or restrictions are to be drawn by reason thereof and that many variations and modifications are within the scope of the invention.

I claim:

1. A process of polymerizing α-olefins which comprises contacting an α-olefin containing 2 to 8 carbon atoms under substantially anhydrous conditions with a catalyst comprising an alkali metal alkyl, a halide of a metal selected from the group consisting of titanium, zirconium, vanadium, chromium and molybdenum, and a promoter selected from the group consisting of sodium oxide, cadmium oxide, potassium oxide, rubidium oxide, mercuric oxide, and cesium oxide, said promoter being present in the polymerization mixture as a solution in a saturated hydrocarbon, the quantity of the promoter being about 1 part per billion to about 1 part per million by weight with respect to said metal halide present in the polymerization mixture.

2. A catalyst for use in the polymerization of α-olefins containing 2 to 8 carbon atoms which consists essentially of an alkali metal alkyl, a halide of a metal selected from the group consisting of titanium, zirconium, vanadium, chromium and molybdenum, and a promoter selected from the group consisting oy sodium oxide, cadmium oxide, potassium oxide, rubidium oxide, mercuric oxide, and cesium oxide, said promoter being present in the polymerization mixture as a solution in a saturated hydrocarbon, the quantity of the promoter being about 1 part per billion to about 1 part per million by weight with respect to said metal halide present in the polymerization mixture.

References Cited in the file of this patent

UNITED STATES PATENTS

| | | |
|---|---|---|
| 2,843,577 | Friedlander et al. | July 15, 1958 |
| 2,862,917 | Anderson et al. | Dec. 2, 1958 |
| 2,867,612 | Pieper et al. | Jan. 6, 1959 |
| 2,905,645 | Anderson et al. | Sept. 22, 1959 |
| 2,909,512 | Bruce | Oct. 20, 1959 |
| 2,970,134 | Anderson | Jan. 31, 1961 |
| 2,981,725 | Tuft et al. | Apr. 25, 1961 |